United States Patent
Walker et al.

(10) Patent No.: US 8,330,866 B2
(45) Date of Patent: Dec. 11, 2012

(54) MULTI-PROGRAM VIEWING IN A WIRELESS APPARATUS

(75) Inventors: Gordon Kent Walker, Poway, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1314 days.

(21) Appl. No.: 11/622,899

(22) Filed: Jan. 12, 2007

(65) Prior Publication Data

US 2007/0195203 A1 Aug. 23, 2007

Related U.S. Application Data

(60) Provisional application No. 60/775,608, filed on Feb. 21, 2006.

(51) Int. Cl.

| | | |
|---|---|---|
| *H04N 5/45* | (2011.01) | |
| *H04L 12/26* | (2006.01) | |
| *H04L 1/00* | (2006.01) | |
| *H04J 3/14* | (2006.01) | |
| *H04J 1/16* | (2006.01) | |
| *G08C 15/00* | (2006.01) | |
| *G06F 11/00* | (2006.01) | |
| *G01R 31/08* | (2006.01) | |
| *G06F 3/00* | (2006.01) | |
| *G06F 13/00* | (2006.01) | |
| *H04N 5/445* | (2006.01) | |
| *H04B 15/00* | (2006.01) | |

(52) U.S. Cl. ... 348/565; 370/231; 370/335; 379/220.01; 725/40; 455/509

(58) Field of Classification Search .......................... None
See application file for complete search history.

(56) References Cited

U.S. PATENT DOCUMENTS

| | | | | |
|---|---|---|---|---|
| 6,826,272 B1 * | 11/2004 | Dalrymple et al. | ...... | 379/220.01 |
| 6,833,874 B2 | 12/2004 | Ozaki et al. | | |
| 7,124,365 B2 | 10/2006 | Cavallerano et al. | | |

(Continued)

FOREIGN PATENT DOCUMENTS

CN 1278138 12/2000

(Continued)

OTHER PUBLICATIONS

Taiwanese Search Report, ROC (Taiwan) Patent Application No. 096106518, TIPO, Jun. 20, 2010.

(Continued)

*Primary Examiner* — Jefferey Harold
*Assistant Examiner* — Sean Haiem
(74) *Attorney, Agent, or Firm* — Ryan N. Farr

(57) ABSTRACT

This disclosure describes a number of techniques for processing multimedia data that can improve multi-program "picture-in-picture" viewing, particularly in a wireless mobile apparatus setting. In one example, a method includes receiving multiple channels of the multimedia data, decoding frames associated with two or more of the channels, presenting first frames of a first channel at a first frame rate, and presenting second frames of a second channel at a second frame rate while presenting the first frames, wherein the second frame rate is lower than the first frame rate. In another example, method includes receiving multiple channels of the multimedia data, receiving channel switch frames (CSFs) associated with the multiple channels, and simultaneously presenting the CSFs associated with two or more of the multiple channels to a user.

90 Claims, 8 Drawing Sheets

U.S. PATENT DOCUMENTS

| | | |
|---|---|---|
| 7,164,714 B2 | 1/2007 | Martin |
| 7,386,870 B2 | 6/2008 | Lu |
| 7,770,785 B2 | 8/2010 | Jha et al. |
| 2003/0014752 A1* | 1/2003 | Zaslavsky et al. ............... 725/40 |
| 2003/0101452 A1 | 5/2003 | Hanaya et al. |
| 2005/0028203 A1 | 2/2005 | Kim |
| 2006/0062363 A1* | 3/2006 | Albrett ..................... 379/101.01 |
| 2006/0194598 A1* | 8/2006 | Kim et al. ..................... 455/509 |
| 2007/0195737 A1 | 8/2007 | Walker et al. |

FOREIGN PATENT DOCUMENTS

| | | |
|---|---|---|
| EP | 0 629 085 A2 | 12/1994 |
| EP | 1061737 | 12/2000 |
| JP | 8279966 A | 10/1996 |
| JP | 10145788 A | 5/1998 |
| JP | 2000013803 A | 1/2000 |
| JP | 2003219309 A | 7/2003 |
| WO | WO 95/28795 A2 | 10/1995 |
| WO | 2005076503 | 8/2005 |
| WO | WO 2005076503 A1 * | 8/2005 |

OTHER PUBLICATIONS

International Search Report and Written Opinion—PCT/US07/062334, International Searching Authority—European Patent Office, Jul. 19, 2007.

* cited by examiner

MULTI-PROGRAM VIEWING IN A WIRELESS APPARATUS

CLAIM OF PRIORITY UNDER 35 U.S.C. §119

This application claims the benefit of U.S. Provisional Application No. 60/775,608, filed Feb. 21, 2006, the entire content of which is incorporated herein by reference.

TECHNICAL FIELD

The disclosure relates to presentation of digital multimedia content and, more particularly, techniques for multi-program viewing in a wireless apparatus.

BACKGROUND

A number of techniques for broadcasting digital multimedia have been developed for reception by mobile wireless apparatuses. Such techniques include those referred to as Forward Link Only (FLO), Digital Multimedia Broadcasting (DMB), and Digital Video Broadcasting-Handheld (DVB-H). Digital multimedia broadcasting typically relies on one or more digital video encoding standards, such as Moving Picture Experts Group (MPEG)-1, MPEG-2, MPEG-4, International Telecommunication Union (ITU) H.263, and ITU H.264. The ITU H.264 standard corresponds to MPEG-4 Part 10, entitled "Advanced Video Coding." These coding standards generally support transmission efficiency of multimedia sequences by encoding data in a compressed manner. Additional techniques, such as frame interpolation and/or layered coding, may also be used.

Digital multimedia broadcasting delivers content as a series of channels, providing a multimedia content selection experience similar to that of a conventional television. Each broadcast channel carries digital data comprising encoded audio/video streams, audio/video clips, or other informational content. The digital broadcast channels are delivered simultaneously on a multicast basis to multiple mobile wireless apparatuses. Each wireless apparatus receives the digital broadcast, and may tune to a particular channel for presentation to the user. To switch channels, a respective wireless apparatus acquires the digital data from a different channel and decodes the data to present the different content to the user.

SUMMARY

This disclosure describes a number of techniques for processing multimedia data that can improve multi-program viewing, particularly in a wireless mobile apparatus setting. The techniques provide for the simultaneous presentation of frames associated with two or more channels of a multicast on a wireless mobile apparatus, sometimes referred to as "picture-in-picture" viewing. In order to support such multi-program viewing in mobile settings, or other settings where computation resources are limited, the techniques may use a relatively low frame rate presentation of at least some of the channels. For example, relatively low resolution channel switch frames (CSFs) may be used for the presentation of low resolution, low frame rate content. This can allow a user to quickly select between channels of interest, and subsequently receive a selected channel in a higher resolution and higher frame rate.

In many cases, the techniques may support the simultaneous presentation of frames associated with two different channels at different frame rates. In particular, a first channel may be presented at a relatively high resolution and relatively high frame rate, and a second channel may be presented in a relatively lower resolution and relatively lower frame rate. In this case, the presentation of the second channel may be based on CSFs for presentation of low-resolution, low frame rate content of that channel. This allows for picture-in-picture viewing at reasonable computation levels in the mobile apparatus. The relatively low-resolution, low frame rate content may be presented on a display within a smaller window than the relatively high-resolution, low frame rate content. A user interface associated with the apparatus may allow the user to identify whether to change channels to the low frame rate content to receive such content at the higher frame rate.

In one aspect, this disclosure provides a method of processing multimedia data. The method comprises receiving multiple channels of the multimedia data, decoding frames associated with two or more of the channels, presenting first frames of a first channel at a first frame rate, and presenting second frames of a second channel at a second frame rate while presenting the first frames, wherein the second frame rate is lower than the first frame rate.

In another aspect, this disclosure provides an apparatus that processes multimedia data comprising a receiver that receives multiple channels of the multimedia data, one or more decoders that decode frames associated with two or more of the channels, and a display, wherein the display presents first frames of a first channel at a first frame rate and presents second frames of a second channel at a second frame rate while presenting the first frames, wherein the second frame rate is lower than the first frame rate.

In another aspect, this disclosure provides an apparatus comprising means for receiving multiple channels of multimedia data, means for decoding frames associated with two or more of the channels, means for presenting first frames of a first channel at a first frame rate, and means for presenting second frames of a second channel at a second frame rate while presenting the first frames, wherein the second frame rate is lower than the first frame rate.

The techniques described herein may be implemented in hardware, software, firmware, or any combination thereof. If implemented in software, the software may be executed in computer, such as a digital signal processor (DSP) or other type of processor. The software that executes the techniques may be initially stored in a computer-readable medium of a computer program product, and loaded and executed in the processor or other computer to allow for multi-channel viewing as described herein.

Accordingly, this disclosure also contemplates a computer program product comprising a computer readable medium comprising instructions that upon execution cause a computer to receive multiple channels of the multimedia data, decode frames associated with two or more of the channels, present first frames of a first channel at a first frame rate, and present second frames of a second channel at a second frame rate while presenting the first frames, wherein the second frame rate is lower than the first frame rate.

This disclosure may also be directed to a processor being configured to receive multiple channels of the multimedia data, decode frames associated with two or more of the channels, cause a display to present first frames of a first channel at a first frame rate, and cause a display to present second frames of a second channel at a second frame rate while presenting the first frames, wherein the second frame rate is lower than the first frame rate.

The details of one or more examples are set forth in the accompanying drawings and the description below. Other features, objects, and advantages will be apparent from the description and drawings, and from the claims.

DETAILED DESCRIPTION

This disclosure is directed to techniques that can improve multi-program viewing, particularly in a wireless mobile apparatus setting. The techniques provide for the simultaneous presentation of frames associated with two or more channels of a multicast on a wireless mobile apparatus. In order to support such multi-program viewing in mobile settings or other settings where computation resources are limited, the techniques may use a relatively low frame rate presentation of at least some of the channels. For example, relatively low resolution channel switch frames (CSFs) may be used for the presentation of low resolution, low frame rate content. This can allow a user to quickly view channels of interest, select one of the channels, and subsequently receive a selected channel in a higher resolution and higher frame rate.

Also, the techniques may support the simultaneous presentation of video frames associated with two different channels at different frame rates. In particular, first channel may be presented at a high resolution and high frame rate, and a second channel may be presented in lower resolution and lower frame rate. In this case, the presentation of the second channel may be based on CSFs for presentation of low-resolution, low frame rate content of that channel. This allows for picture-in-picture (PIP) viewing at reasonable computation levels in the wireless mobile apparatus. The CSFs may be encoded and transmitted at the lower frame rate, while each respective channel may be encoded and transmitted at the higher frame rate The low-resolution, low frame rate content may be presented on a display of the apparatus within a smaller window than the high-resolution, low frame rate content. A user interface associated with the apparatus may allow the user to identify whether to change channels to the low frame rate content to receive such content at the higher frame rate. The user may be able to configure PIP viewing to the user's liking, and may be able to select among low frame rate content, for presentation at a higher frame rate, or may be able to toggle between low frame rate content and high frame rate content.

Figure 1:
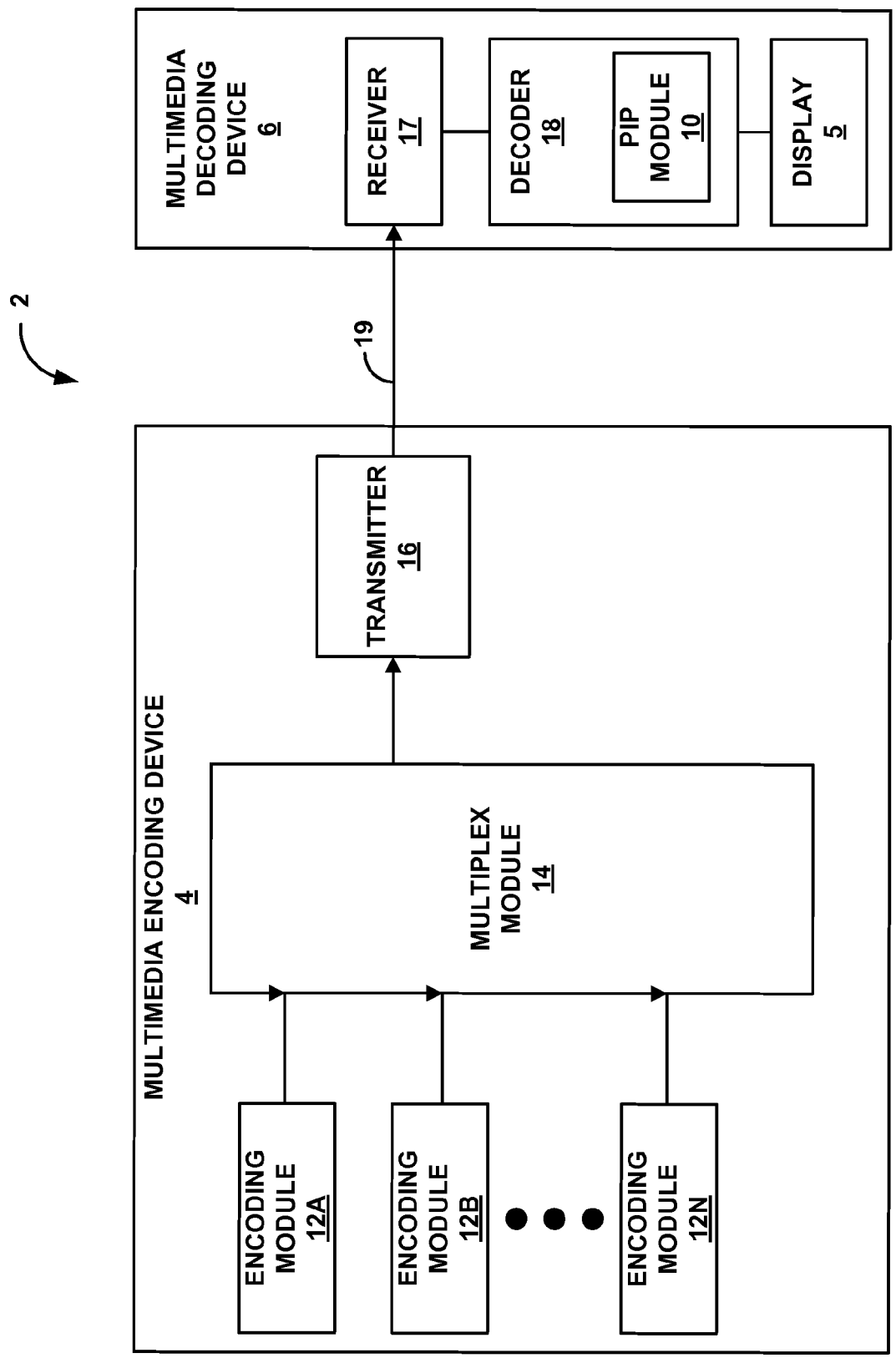
FIG. 1 is a block diagram illustrating a multimedia broadcasting system, which is one example of a system that may implement one or more of the techniques described in this disclosure.

FIG. 1 is a block diagram illustrating one sample system 2 that may implement the techniques of this disclosure. System 2 is merely a sample, as the techniques of this disclosure could be implemented in any setting where the simultaneous presentation of two or more multimedia sequences is desirable. In system 2, a digital multimedia coding apparatus 4 delivers content as a series of channels to many apparatuses. For purposes of illustration, however, a single multimedia decoding apparatus 6 is illustrated in FIG. 1. In most cases, several similar apparatuses (like apparatus 6) would receive the same broadcasts from apparatus 4, but could individually tune to different channels. System 2 allows multimedia content delivery to apparatus 4 in a manner that provides a user experience similar to that of a conventional television.

Multimedia coding apparatus 4 may form part of a broadcast network component used to broadcast one or more channels of video to wireless subscriber apparatuses. Multimedia coding apparatus 4 is one example of a multicast apparatus capable of broadcasting a multicast. In other examples, a multicast apparatus need not actually perform the encoding, but could simply be realized with a broadcast component or apparatus that broadcasts multimedia data in a multicast. In such cases, the multimedia content could be obtained from one or more live or prerecorded multimedia feeds from a variety of content providers.

By way of example, multimedia decoding apparatus 6 may be implemented as part of a digital television, a wireless communication apparatus, a portable digital assistant (PDA), a laptop computer or desktop computer, a digital music and video apparatus, such as those sold under the trademark "iPod," a video gaming apparatus, or a radiotelephone such as cellular, satellite or terrestrial-based radiotelephone. In most of the following examples, the decoding apparatus is assumed to be a wireless radiotelephone, although this disclosure is not limited in this respect.

Multimedia coding apparatus 4 and multimedia decoding apparatus 6 may be implemented as one or more processors, digital signal processors, application specific integrated circuits (ASICs), field programmable gate arrays (FPGAs), discrete logic, software, hardware, firmware, or any combinations thereof. The illustrated components of apparatus 4 and apparatus 6 may be included in one or more encoder or decoders, either of which may be integrated as part of an encoder/decoder (CODEC). In some cases, the transmitter 23 and receiver 27 may be formed on different components or chips than the other components. Transmitter 23 and reliever 27 may include suitable RF components such as a modem, filters, frequency conversion units, amplifiers, and/or other components.

As noted, multimedia coding apparatus 4 may form part of a broadcast network component used to broadcast one or more channels of video data. Examples of such components include wireless base stations or any infrastructure node used to broadcast the encoded multimedia data. As shown in FIG. 1, multimedia coding apparatus 4 includes a plurality of encoding modules 12A-12N (collectively "modules 12"). Each of these encoding modules 12 may comprise a separate encoder or encoding process. Each of encoding modules 12 encodes multimedia content for a different channel. The different channels may comprise different programs, such as news broadcasts, sporting events, television programs, movies, or the like. Moreover, different channels may present similar content in different views, such as the same sporting event from different camera angles.

Once encoded, the content from encoding modules 12 is provided to multiplex module 14, which combines the content into a multicast. If needed, multiplex module 14 may communicate with encoding modules 12 to adjust encoding rates applied by different ones of encoding modules 12, e.g., to meet bandwidth requirements of communication channel 19. Transmitter 16 transmits the multicast, including the encoded multimedia content of many different channels, to multimedia decoding apparatuses. Again, for purposes of illustration, FIG. 1 shows a single multimedia decoding apparatus 6. In practice, however, many similar multimedia decoding apparatuses (like apparatus 6) may receive the same multicast from multimedia coding apparatus 4.

Communication channel 19 is typically a wireless channel, but is not limited by any particular wireless communication technique. By way of example, the multicast data may be communicated over channel 19 via code division multiple access (CDMA) techniques, frequency division multiple access (FDMA) techniques, time division multiple access (FDMA) techniques, other techniques, or various combinations of such techniques. For broadcast, many other techniques, such as amplitude modulation (AM), frequency modulation (FM), combinations of the techniques listed herein, or other types of modulation or coding, could also be used.

Receiver 17 of multi-media decoding apparatus 6 receives the multicast over wireless channel 19. Decoder 18 may then tune to a particular channel of interest, e.g., in response to a user selection, and may decode the content of that channel. Display 5 is used to display the decoded content. In accordance with this disclosure, decoder 18 includes a picture-in-picture (PIP) module 10. PIP module 10 is the portion of decoder 18 (or a separate decoder) that facilitates the simultaneous presentation of frames associated with two or more channels of the multicast on display 5. For example, PIP module 10 may decode relatively low resolution channel switch frames (CSFs), and display 5 can present the CSFs as low resolution, low frame rate content. The techniques of this disclosure may be executed by a single decoder 18, or multiple decoders. PIP module 10, for example, could be implemented as a second decoder.

CSFs refer to frames of a multicast that are included for purposes of channel switching. When a user switches channels in a multicast, problems may occur due to interframe dependencies associated with predictive-based video coding. In order to reduce or eliminate these problems, CSFs may be periodically included for a channel. CSFs may comprise non-predictive frames used for each channel of the multicast in the event of channel switching. CSFs may have lower resolution than regular frames, but generally reduce or eliminate problems that may otherwise manifest following a channel change due to the fact that they are non-predictive. By non-predictive, this disclosure means that the CSFs do not depend upon previous or subsequent frames, and are decodable without reliance on motion vectors to video blocks of other frames. CSFs may be delivered periodically to ensure that channel switching does not result in extensive periods of predictive-based problems in the decoding following a channel switch.

In some examples, a CSF may encapsulated in one or more supplemental enhancement information (SEI) network abstraction layer (NAL) Units, and may be referred to as an SEI CSF. The CSF can be encapsulated in an independent transport protocol packet to enable visibility into random access points in the coded bitstream. For CSF decoding, if a channel change request is initiated, the CSF in the requested channel will be decoded. If the CSF may be contained in a SEI CSF message.

By way of example, frames of each channel may be delivered at approximately 30 frames per second, and CSFs may be delivered at approximately 1 frame per second. These rates are merely samples, however, as the techniques described herein could be implemented with a variety of other frame rates. The CSFs may be included in each particular channel, or may be included on a media logical channel (MLC). In some cases, the MLC may include pointers to the CSFs in the other channels, or pointers to the CSFs in the MLC. In these cases, PIP module 10 can use pointers to quickly and efficiently locate the CSFs for decoding and presentation to a user. In other cases, the CSFs may be located without pointers, which may be a less efficient approach. In any case, the presentation of CSFs at a relatively low frame rate may allow a user to quickly select between channels of interest, and subsequently tune to a selected channel in a higher resolution and higher frame rate.

Any user selections, described herein, may be made via a user interface, which may include, for example, an alphanumeric keypad, touch screen, scroll wheel, directional pad, joystick, touchpad, voice recognition, or the like. For simplicity, these optional input components of apparatus 6 are not illustrated in FIG. 1. The user interface may couple to decoder 18 that drives display 5, or to a processor (not shown) may be used to drive display 5 in response to the user input from the user interface, in which case the processor would couple to both display 5 and the user interface.

PIP module 10 facilitates the simultaneous presentation of frames associated with two different channels at different frame rates on display 5. Decoder 18 may decode a first channel at a high resolution and high frame rate, which is presented on display 5. At the same time, PIP module 10 of decoder 18 may decode a second channel at a lower resolution and lower frame rate, which is also presented on display 5. The presentation of the second channel may be based on CSFs, as noted above, or could be based on other techniques, such as sub-sampling of the frames of a channel. If sub-sampling is used, decoder 18 may decode substantially all received and encoded frames associated with the first channel, and PIP module 10 may decode a subset of received and encoded frames associated with the second channel. In any case, PIP module 10 can allow for picture-in-picture viewing on display 5 at reasonable computation levels in multimedia decoding apparatus 6.

The low-resolution, low frame rate content decoded by PIP module 10 may be presented on display 5 in a smaller window than the high-resolution, low frame rate content, allowing the user to identify whether to change channels to the low frame rate content to receive such content at the higher frame rate. The user may be able to configure the picture-in-picture viewing on display 5 to the user's liking, and may be able to select among low frame rate content for presentation at a higher frame rate, or may be able to toggle between low frame rate content and high frame rate content. In some cases or modes of apparatus 6, PIP module 10 may decode several CSFs for presentation of several low resolution channels to a user without the presentation of any high resolution channels. This mode, for example, may comprise a menu mode on display 5 in which the user is able to see many channels and select among such channels. Again, user selections or display configuration, described herein, can be made via selections from an alphanumeric keypad, touch screen, touchpad, voice recognition, or any input mechanism used for apparatus 6.

Figure 2:
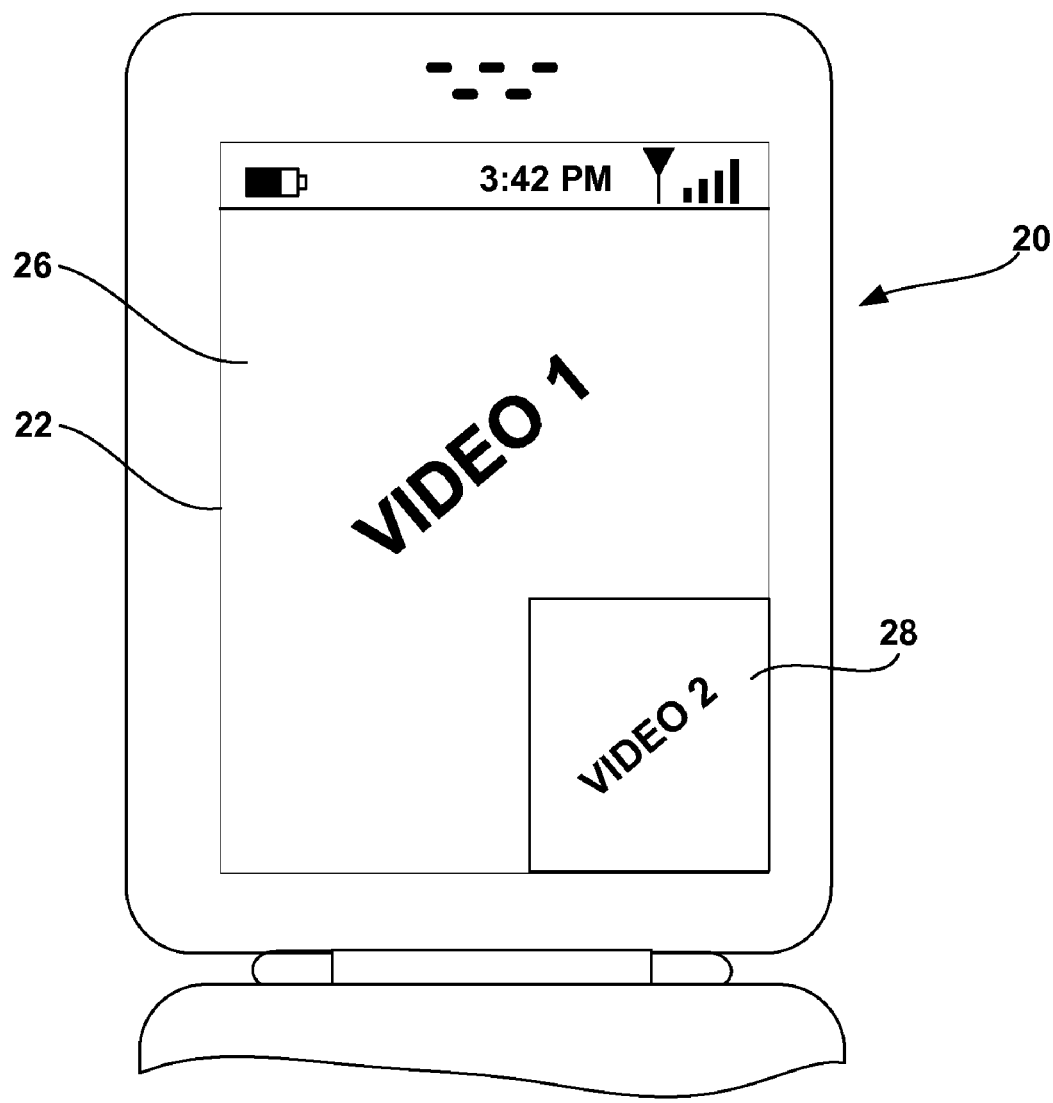
FIGS. 2-5 are front views of screens of wireless mobile apparatuses implementing techniques of this disclosure.

FIGS. 2-5 are front views of screens of mobile apparatuses implementing picture-in-picture techniques of this disclosure. As shown in FIG. 2, an apparatus 20 includes a display 22 that presents first multimedia frames 26 (labeled "video 1") and second multimedia frames 28 (labeled "video 2") simultaneously. In particular, first multimedia frames 26 may be presented at a first frame rate that is higher than the second first frame rate associate with the presentation of second multimedia frames 28. The presentation of second multimedia frames 28 may be based on CSFs, although this disclosure is not necessarily limited in this respect.

A user may be able to select which channels are presented as first multimedia frames 26 and second multimedia frames 28, and possibly toggle views. When the toggling occurs, the second multimedia frames 28 are presented in the larger window and the first multimedia frames 26. In other words, toggling causes the relative positions of the first frames 26 relative to the second frames 28 to be switched. The frame rate for the smaller window may remain less than that of the larger window. Thus, following toggling, the presentation of the first frames occurs at the slower frame rate in the smaller window, and the presentation of the second frames occurs at the higher frame rate in the larger window. As illustrated in FIG. 2, in this example, the smaller window overlays the bottom left corner of the larger window.

Figure 3:
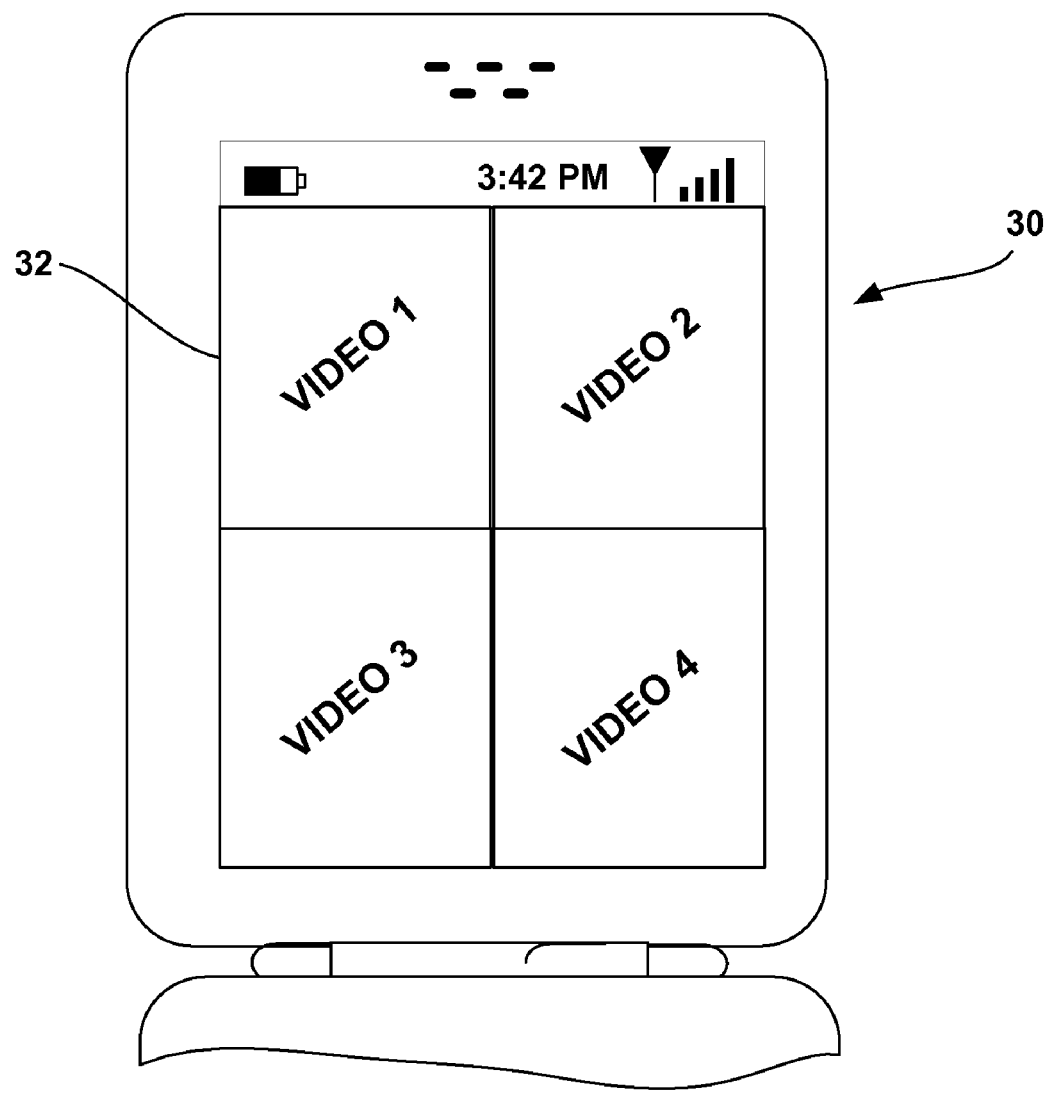

FIG. 3 is another sample front view of a screen 32 of a mobile apparatus 30 implementing picture-in-picture techniques of this disclosure. In this example, display screen 32 is divided into four different views (video 1-4), which each present multimedia frames associated with a different channel. In this case, each view may present a low-resolution, low frame rate sequence based on CSFs for the different channels. Alternatively, one view (say video 1) may be presented at a normal high resolution and high frame rate, with the other views (say video 2-4) being presented at the low resolution and low frame rate.

Figure 4:
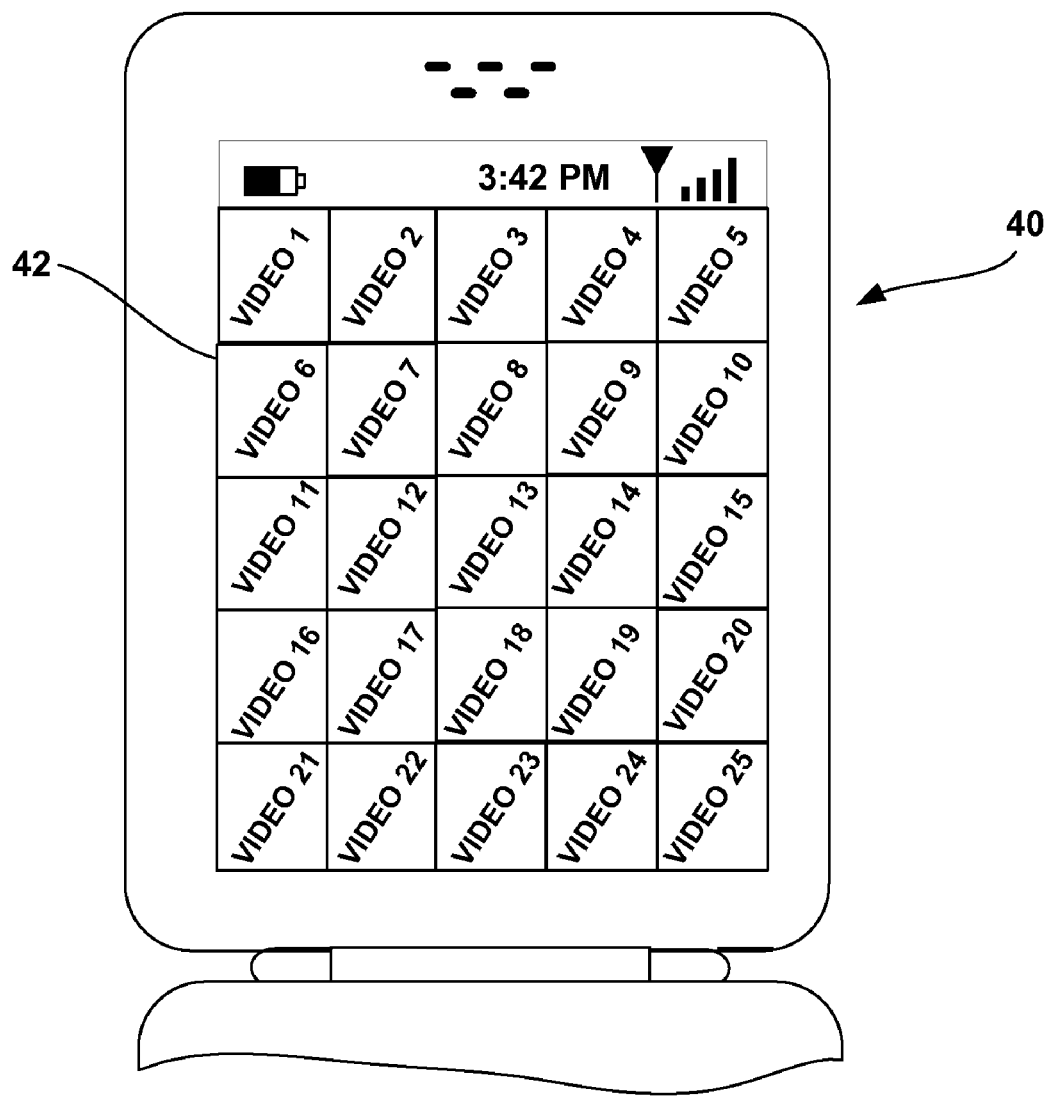

FIG. 4 is another sample front view of a screen 42 of a mobile apparatus 40 implementing picture-in-picture techniques of this disclosure. In this example, display screen 42 is divided into many views (video 1-25), which each present multimedia frames associated with a different channel. In this case, each view may present a low-resolution, low frame rate sequence based on CSFs for the different channels. This view of screen 42 may correspond to a menu option in which a user is able to see content from all possible channels, and select a channel of interest. Following the selection, the selected channel may be presented at the high frame rate and high resolution.

Figure 5:
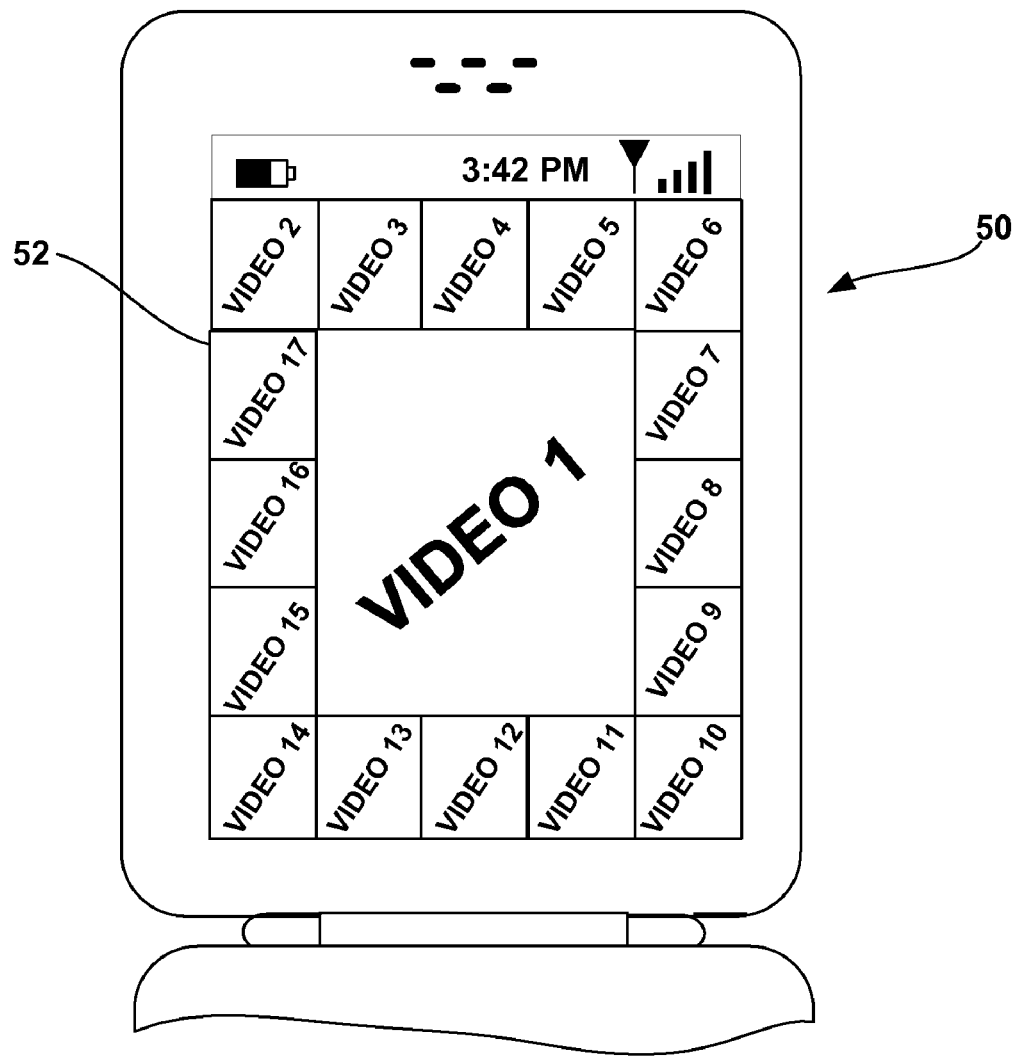

FIG. 5 is another sample front view of a screen 52 of a mobile apparatus 50 implementing picture-in-picture techniques of this disclosure. In this example, display screen 42 is divided into one large view (video 1) and many smaller views (video 2-17). The smaller views (video 2-17) are disposed around a periphery of the large view. The smaller views (video 2-17) comprise low frame rate, low resolution presentation of the frames of different channels that may be selected. The larger view (video 1) comprises a high frame rate, high resolution presentation of the frames of a selected channel. In this manner, a user may be able to see many low resolution, low frame rate views, and may use these views to ascertain whether to change channels. At the same time, a user can see a high resolution, high frame rate view of a selected channel (video 1).

According to this disclosure, a user may be able to configure the different views, such as shown in the examples of FIGS. 2-5. Many other picture-in-picture arrangements, however, could also be pre-defined or configured by a user. The user may input configuration data to configure the picture-in-picture viewing and define which views have a low frame rate and which views have a high frame rate. Alternatively, the user may simply select a desired picture-in-picture view screen from a menu option on apparatus 6.

Figure 6:
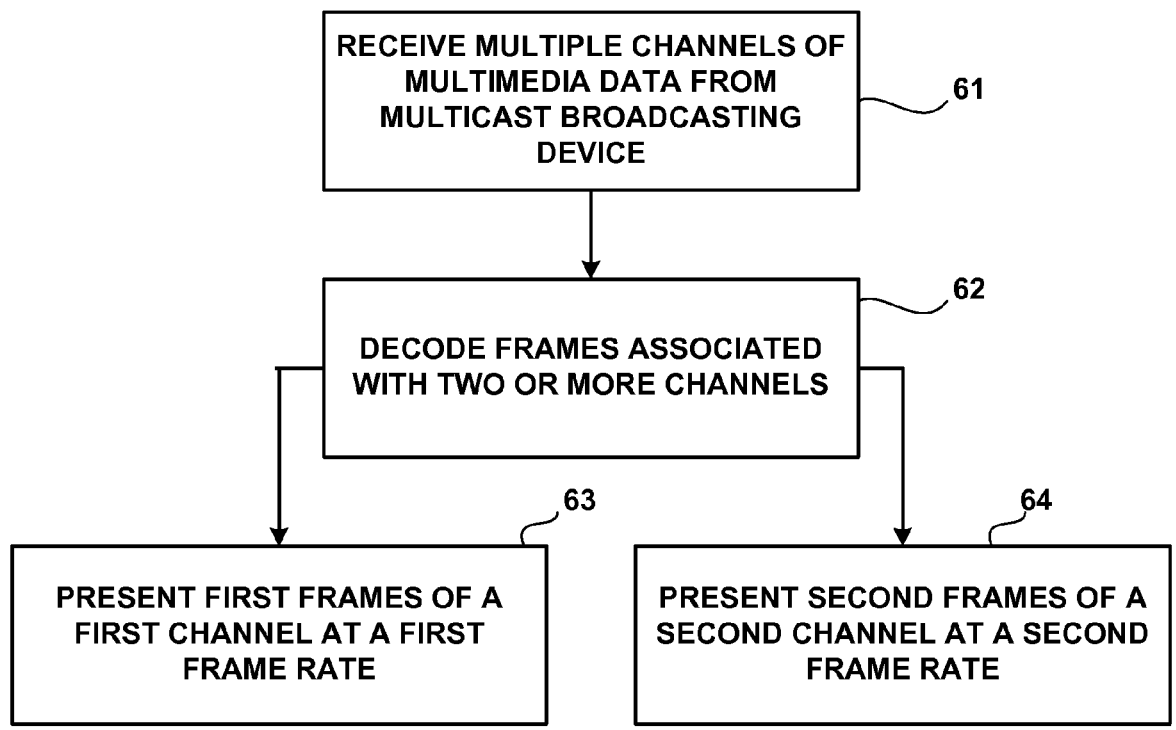
FIGS. 6 and 7 are flow diagrams illustrating techniques that can facilitate multi-channel viewing according to this disclosure.

FIG. 6 is a flow diagram illustrating a technique consistent with the teaching of this disclosure. FIG. 6 will be described with reference to system 2 of FIG. 1, although other systems could also support the techniques. As shown in FIG. 6, receiver 17 of multimedia decoding apparatus 6 receives multiple channels of multimedia data (61). Multimedia encoding apparatus 4 is one example of a multimedia broadcasting apparatus that sends multicast to many apparatuses like apparatus 6. Once apparatus 6 has received the multiple channels of multimedia data, decoder 18 decodes frames associated with two or more channels (62). For example, decoder 18 may acquire and decode the frames of one channel, while PIP module 10 acquires and decodes the CSFs for another channel.

Display 5 of multimedia decoding apparatus 6 then presents first frames of a first channel at a first frame rate (63) while presenting frames of a second channel at a second frame rate (64). As an example, the first frame rate may be greater than approximately 15 frames per second and the second frame rate may be less than approximately 15 frames per second. In one specific example, the first frame rate may be approximately 30 frames per second and the second frame rate may be approximately 1 frame per second. These rates may be due to approximately 30 frames per second encoding of the multicast channels with approximately 1 frame per second CSF encoding.

The user of apparatus 6 may be able to define relative positions of the first frames relative to the second frames within a common display 5 of apparatus 6 for picture-in-picture viewing. In particular, these relative positions (such as shown in the examples of FIGS. 2-5) may be defined based on user input. Referring again to FIG. 2, for example, a user may be able to define the size, shape and positioning of the window associated with first multimedia frames 26 and second multimedia frames 28 to define a picture-in-picture to the user's liking. Alternatively, a user may simply select a desired picture-in-picture view screen from a menu of apparatus 6. In addition, a user may be able to swap views, i.e., swap the relative positions of the first multimedia frames 26 relative to the second multimedia frames 28. When this occurs, the first frames 26 may be presented at the second frame rate and the second frames 28 may be presented at the first frame rate, and the windows associated with these different frames may be swapped.

The techniques of this disclosure also support the presentation of additional frames of additional channels for multiple pictures-in-picture. For example, third frames of a third channel may be presented at the second frame rate while presenting the first frames. Again, CSFs may provide a relatively simple mechanism to support such picture-in-picture or multiple pictures-in-picture viewing. For a high resolution, high frame rate window, decoder 18 may decode substantially all received frames associated with a first channel. For one or more low resolution, low frame rate windows, PIP module 10 may decode CSFs for those channels.

PIP module 10 may decode the CSFs by accessing pointers to the CSFs from a media logical channel (MLC). The CSFs themselves may be stored in the MLC, or may be stored in each respective channel. In either case, PIP module 10 may acquire the CSFs based on the pointers. The pointers, therefore, may identify the CSFs within the MLC, or may point to locations of the CSFs within the respective channels associated with each set of media content. The different content may comprise different programs, such as news broadcasts, sporting events, television programs, movies, or the like. Moreover, different channels may present different views of a common broadcast, such as the same sporting event from different camera angles. The CSFs comprise non-predictive frames. In addition, the CSFs, which are presented at the lower frame rate, may also be of lower spatial resolution than normal frames, although this disclosure is not necessarily limited in this respect. In other words, the first and second frames presented at different frame rates (63 and 64) may also have different resolution such that the lower frame rate presentation is also of lower quality in terms of resolution of the respective frames. The CSFs, for example, may be encoded with a higher quantization parameter than regular frames.

Figure 7:
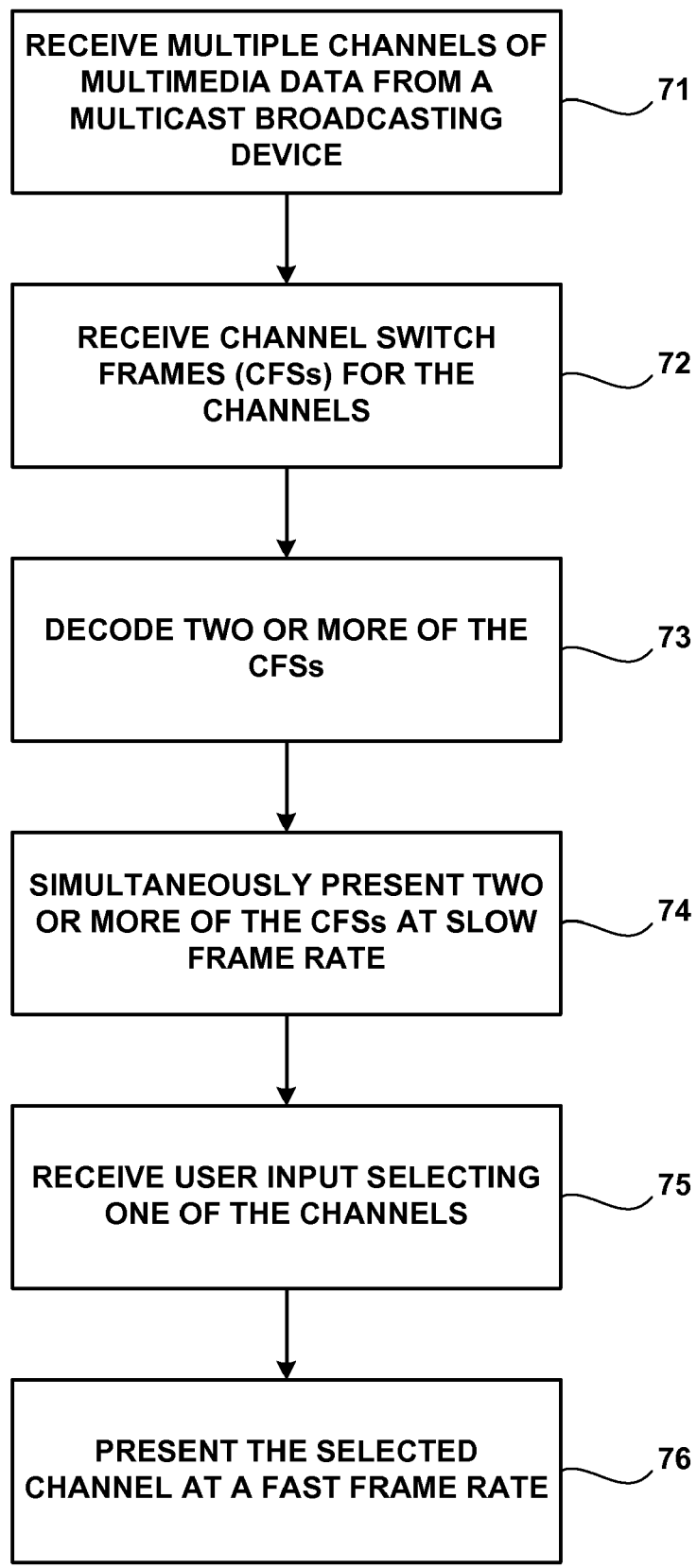

FIG. 7 is another flow diagram illustrating another technique that can facilitate multi-channel viewing according to this disclosure. As shown in FIG. 7, receiver 17 of multimedia decoding apparatus 6 receives multiple channels of multimedia data (71). In addition, receiver 17 receives CSFs for the channels (72). Decoder 18 decodes two or more of the CSFs (73), and display 5 simultaneously presents two or more of the CSFs at a "slow" frame rate. The "slow" frame rate may be defined by the number of CSFs received per second, which may be 1 frame per second, or may be defined at a higher or lower rate. FIGS. 3 and 4 illustrate two sample views in which multiple channels may be simultaneously presented at these "slow" frame rates. This can allow for user selection of a channel of interest without incurring the more intensive computational cost associated with a full decode of one or more channels.

Based on the presentation of two or more of the CSFs at a "slow" frame rate, a user may select on of the channels for subsequent viewing at a "fast" frame rate. This "fast" frame rate may be approximately 30 frames per second, although this disclosure is not limited in this respect. More generally, in this context, the phrases "slow frame rate" and "fast frame rate" are relative terms and do not necessarily imply any particular rates, as long as the slow frame rate is slower than the fast frame rate. When apparatus 6 receives user input selecting one of the channels (75), display 5 then presents the selected channel at the fast frame rate (76). In this manner, two or more channels may be presented at a slow frame rate to facilitate user-informed channel selection without incurring computational complexity associated with decoding a channel at a higher frame rate. Then, following the channel selection, only that selected channel may be fully decoded and presented at the fast frame rate. As noted above, frames presented at the slow frame rate may also be presented in a low resolution format relative to frames presented at the fast frame rate. User selections may be received via an alphanumeric keypad, touch screen, scroll wheel, directional pad, joystick, touchpad, voice recognition, or any input means.

The CSFs may be included in each of the multiple channels. In order to facilitate fast acquisition of the CSFs, pointers may be defined in an MLC to locate the CSFs within other channels. Alternatively, the MLC itself may contains the CSFs for other channels. In still other cases, the CSFs may be included in the different channels, and may be acquired without the help of any pointers, although this method may be less efficient.

Figure 8:
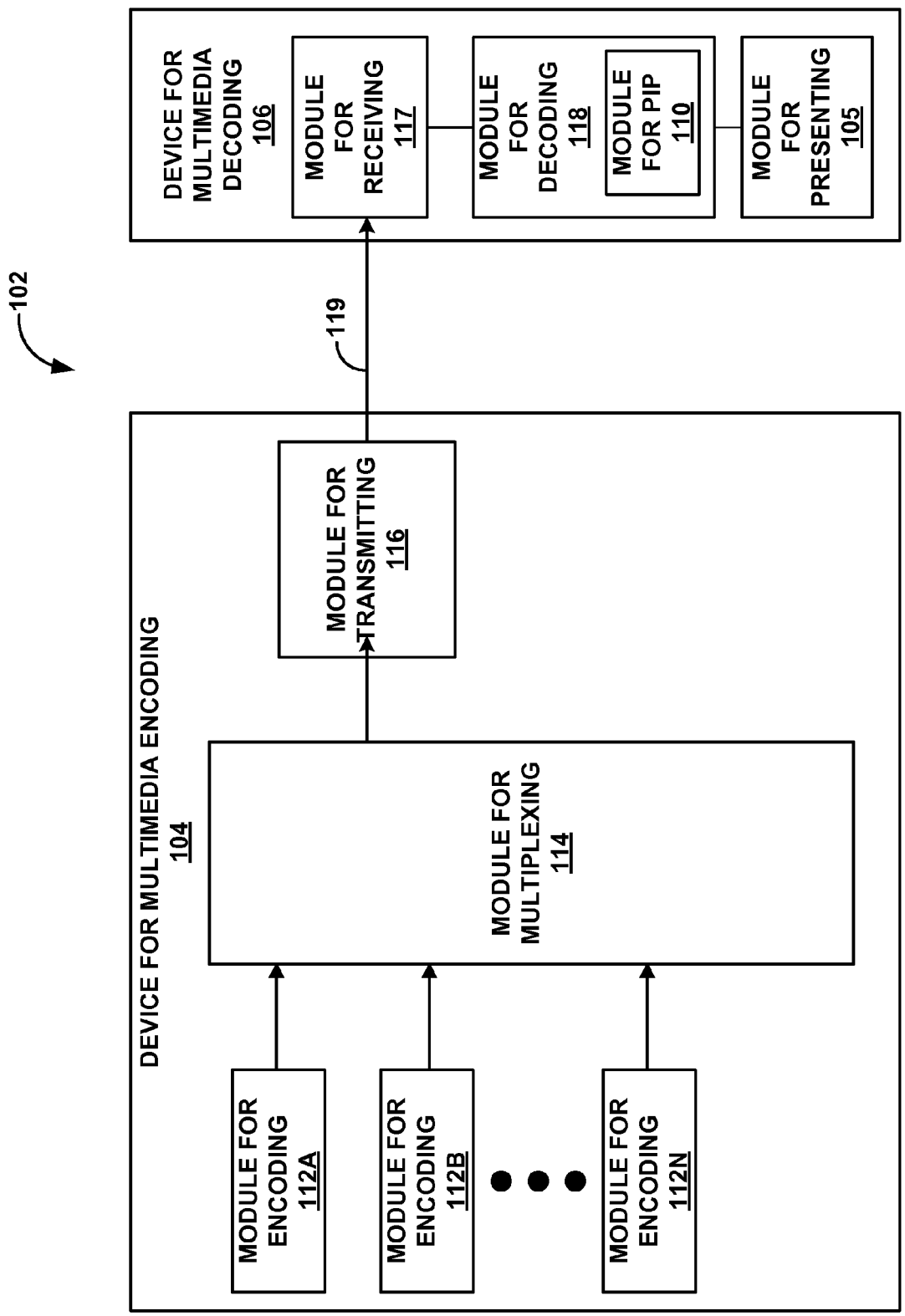
FIG. 8 is another block diagram illustrating a system that may implement one or more of the techniques described herein.

FIG. 8 is another block diagram illustrating a system 102 that may implement one or more of the techniques described herein. As shown in FIG. 8, apparatus for multimedia coding 104 includes a plurality of modules for encoding 112A-112N (collectively "modules for encoding 112"). Each of these modules for encoding 112 may comprise a separate encoder or encoding process. Each of modules 112 encodes multimedia content for a different channel. Once encoded, the content from modules for encoding 112 is provided to module for multiplexing 114, which combines the content into a multicast.

Module for transmitting 116 then transmits the multicast over a communication channel 119, which is typically a wireless channel, but is not limited by any particular wireless communication technique. A number of apparatuses for multimedia decoding may receive the multicast, although apparatus 106 is the only receiving apparatus illustrated. Module for receiving 117 receives the multicast over wireless channel 119. Module for decoding 118 may then tune to a particular channel of interest, e.g., in response to a user selection, and may decode the content of that channel. Module for presenting 105 is used to present the decoded content. As described herein, module for decoding 118 includes a module for picture-in-picture (PIP) 110. Module for PIP 110 is the portion of module for decoding 118 (or a separate decoder or process) that facilitates the simultaneous presentation of frames associated with two or more channels of the multicast on module for presenting 105. For example, module for PIP 110 may decode relatively low resolution CSFs, and module for presenting 105 can present the CSFs as low resolution, low frame rate content. The techniques of this disclosure may be executed by a single decoder, or multiple decoders.

In accordance with this disclosure, means for encoding may comprise encoding modules 12 (FIG. 1) or modules for encoding 112 (FIG. 8). Means for multiplexing may comprise a multiplex module 14 (FIG. 7) or a module for multiplexing 114 (FIG. 8). Means for transmitting may comprise a transmitter 16 (FIG. 1) or a module for transmitting 116 (FIG. 8).

On the receiving side, means for receiving may comprise a receiver 17 (FIG. 1) or a module for receiving 117 (FIG. 8). Means for decoding may comprise a decoder 18 (FIG. 1) or a module for decoding 118 (FIG. 8). Means for PIP may comprise a PIP module 10 (FIG. 1) or a module for PIP 110 (FIG. 8), either of which may be separate units or units integrated in decoder 18 or module for decoding 118. Means for presenting may comprise a display 5 (FIG. 1) or a module for presenting 105 (FIG. 8). Any user input, as described herein, may be captured from an alphanumeric keypad, touchscreen, joystick, voice recognition, or any input means. Such apparatuses may be referred to as a means for controlling the presentation of PIP, means for swapping views of PIP, means for selecting views of PIP, or the like.

A number of examples have been described. The techniques of this disclosure may improve multi-program viewing, particularly in a wireless mobile apparatus setting. The techniques described herein may be implemented in hardware, software, firmware, or any combination thereof. If implemented in software, the techniques may be realized at least in part by one or more stored or transmitted instructions or code on a computer-readable medium of a computer program product. Computer-readable media may include computer storage media, communication media, or both, and may include any medium that facilitates transfer of a computer program from one place to another. A storage media may be any available media that can be accessed by a computer. The computer program product may include packaging materials.

By way of example, and not limitation, computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage apparatuses, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers.

Combinations of the above should also be included within the scope of computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Nevertheless, various modifications may be made to the techniques described without departing from the scope of the following claims. For example, other techniques that do not use CSFs could also be used to realize the presentation of low resolution, low frame rate content as the picture-in-picture frames within a higher rate presentation of other content.

Furthermore, it should be apparent that the teachings herein may be embodied in a wide variety of forms and that any specific structure and/or function disclosed herein is merely representative. Based on the teachings herein one skilled in the art will appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein.

Accordingly, these and other aspects are within the scope of the following claims.

The invention claimed is:

1. A method of processing multimedia data, the method comprising:
   receiving multiple channels of the multimedia data;
   decoding frames associated with two or more of the channels;
   presenting first frames of a first channel at a first frame rate; and
   presenting second frames of a second channel at a second frame rate while presenting the first frames, wherein the second frame rate is lower than the first frame rate,
   wherein decoding the frames comprises:
      decoding substantially all received frames associated with the first channel; and
      decoding channel switch frames (CSFs) associated with the second channel,
   wherein each individual channel switch frame (CSF) is a non-predictive frame.

2. The method of claim 1, wherein presenting the first and second frames comprises presenting the first and second frames within a common display of a wireless apparatus.

3. The method of claim 2, further comprising decoding the frames with a single decoder within the wireless apparatus.

4. The method of claim 2, further comprising defining relative positions of the first frames relative to the second frames within the common display based on user input.

5. The method of claim 4, further comprising:
   swapping the relative positions of the first frames relative to the second frames;
   presenting the first frames at the second frame rate; and
   presenting the second frames at the first frame rate.

6. The method of claim 1, wherein presenting the second frames comprises presenting the second frames within the first frames in a picture-in-picture format.

7. The method of claim 1, further comprising presenting a plurality of frames around a periphery of the first frames, wherein the second frames are included within the plurality of frames around the periphery.

8. The method of claim 1, wherein the first frame rate is approximately 30 frames per second and the second frame rate is approximately 1 frame per second.

9. The method of claim 1, further comprising presenting third frames of a third channel at the second frame rate while presenting the first frames.

10. The method of claim 1, wherein decoding the frames comprises:
    decoding substantially all received frames associated with the first channel; and
    decoding a subset of received frames associated with the second channel.

11. The method of claim 1, wherein decoding the CSFs comprises accessing pointers from a media logical channel (MLC) to the CSFs within the second channel and acquiring the CSFs from the second channel based on the pointers.

12. The method of claim 1, wherein decoding the CSFs comprises acquiring the CSFs associated with the second channel from a media logical channel (MLC).

13. The method of claim 12, further comprising accessing pointers from the MLC to the CSFs, the CSFs being within the MLC.

14. The method of claim 1, wherein decoding the CSFs comprises acquiring the CSFs from the second channel.

15. The method of claim 1, wherein the first and second channels comprise two different views associated with a common broadcast.

16. The method of claim 1, further comprising presenting the second frames at a lower resolution than the first frames.

17. The method of claim 1, wherein the first frames are encoded at the first frame rate and the second frame are encoded at the second frame rate.

18. An apparatus that processes multimedia data comprising:
    a receiver that receives multiple channels of the multimedia data;
    one or more decoders that decode frames associated with two or more of the channels, wherein the one or more decoders:
       decode substantially all received frames associated with the first channel, and
       decode channel switch frames (CSFs) associated with the second channel; and
    a display, wherein the display presents first frames of a first channel at a first frame rate and presents second frames of a second channel at a second frame rate while presenting the first frames, wherein the second frame rate is lower than the first frame rate, wherein each individual channel switch frame (CSF) is a non-predictive frame that is configured to be individually displayed in response to a channel change request.

19. The apparatus of claim 18, wherein the apparatus comprises a wireless apparatus.

20. The apparatus of claim 18, wherein the one or more decoders comprises a single decoder that performs decoding associated with the two or more of the channels.

21. The apparatus of claim 18, wherein the apparatus receives user input and defines relative positions of first frames relative to the second frames within the display based on the user input.

22. The apparatus of claim 21, wherein the apparatus:
swaps the relative positions of the first frames relative to the second frames on the display;
presents the first frames at the second frame rate on the display; and
presents the second frames at the first frame rate on the display.

23. The apparatus of claim 18, wherein the second frames are presented on the display within the first frames as a picture-in-picture.

24. The apparatus of claim 18, wherein the display presents a plurality of frames around a periphery of the first frames, wherein the second frames are included within the plurality of frames around the periphery.

25. The apparatus of claim 18, wherein the first frame rate is approximately 30 frames per second and the second frame rate is approximately 1 frame per second.

26. The apparatus of claim 18, wherein the display presents third frames of a third channel at the second frame rate while presenting the first frames.

27. The apparatus of claim 18, wherein the one or more decoders:
decode substantially all received frames associated with the first channel; and
decode a subset of received frames associated with the second channel.

28. The apparatus of claim 18, wherein the one or more decoders access pointers from a media logical channel (MLC) to the CSFs within the second channel and acquire the CSFs from the second channel based on the pointers.

29. The apparatus of claim 18, wherein the one or more decoders acquire the CSFs associated with the second channel from a media logical channel (MLC).

30. The apparatus of claim 29, wherein the one or more decoders acquire pointers from the MLC to the CSFs, the CSFs being within the MLC.

31. The apparatus of claim 18, wherein the one or more decoders acquire the CSFs from the second channel.

32. The apparatus of claim 18, wherein the first and second channels comprise two different views associated with a common broadcast.

33. The apparatus of claim 18, wherein the display presents the second frames at a lower resolution than the first frames.

34. The apparatus of claim 18, wherein the first frames are encoded at the first frame rate and the second frame are encoded at the second frame rate and wherein the decoder decodes the first and second frames according to their respective encoding rates to present the first and second frames on the display.

35. An apparatus comprising
means for receiving multiple channels of multimedia data;
means for decoding frames associated with two or more of the channels;
means for presenting first frames of a first channel at a first frame rate; and
means for presenting second frames of a second channel at a second frame rate while presenting the first frames, wherein the second frame rate is lower than the first frame rate,
wherein the means for decoding the frames:
decodes substantially all received frames associated with the first channel; and
decodes channel switch frames (CSFs) associated with the second channel,
wherein each individual channel switch frame (CSF) is a non-predictive frame.

36. The apparatus of claim 35, wherein the apparatus comprises a wireless apparatus, and the means for presenting the first frames and the means for presenting the second frames comprises a common display of the wireless apparatus.

37. The apparatus of claim 36, wherein the means for decoding comprises a single decoder within the wireless apparatus.

38. The apparatus of claim 35, further comprising means for defining relative positions of first frames relative to the second frames based on user input.

39. The apparatus of claim 38, further comprising:
means for swapping the relative positions of the first frames relative to the second frames;
means for presenting the first frames at the second frame rate; and
means for presenting the second frames at the first frame rate.

40. The apparatus of claim 35, wherein the means for presenting presents the second frames within the first frames in a picture-in-picture format.

41. The apparatus of claim 35, wherein the means for presenting presents a plurality of frames around a periphery of the first frames, wherein the second frames are included within the plurality of frames around the periphery.

42. The apparatus of claim 35, wherein the first frame rate is approximately 30 frames per second and the second frame rate is approximately 1 frame per second.

43. The apparatus of claim 35, further comprising means for presenting third frames of a third channel at the second frame rate while presenting the first frames.

44. The apparatus of claim 35, wherein the means for decoding the frames:
decodes substantially all received frames associated with the first channel; and
decodes a subset of received frames associated with the second channel.

45. The apparatus of claim 35, wherein the means for decoding accesses pointers from a media logical channel (MLC) to the CSFs within the second channel and acquires the CSFs from the second channel based on the pointers.

46. The apparatus of claim 35, wherein the means for decoding acquires the CSFs associated with the second channel from a media logical channel (MLC).

47. The apparatus of claim 46, wherein the means for decoding accesses pointers from the MLC to the CSFs, the CSFs being within the MLC.

48. The apparatus of claim 35, wherein the means for decoding acquires the CSFs from the second channel.

49. The apparatus of claim 35, wherein the first and second channels comprise two different views associated with a common broadcast.

50. The apparatus of claim 35, further comprising means for presenting the second frames at a lower resolution than the first frames.

51. The apparatus of claim 35, wherein the first frames are encoded at the first frame rate and the second frame are encoded at the second frame rate.

52. A computer program product for processing multimedia data comprising:
a non-transitory computer readable medium comprising instructions that upon execution cause a computer to:
receive multiple channels of the multimedia data;
decode frames associated with two or more of the channels, by decoding substantially all received frames associated with the first channel, and decoding channel switch frames (CSFs) associated with the second channel, wherein each individual channel switch frame (CSF) is a non-predictive frame;

present first frames of a first channel at a first frame rate; and present second frames of a second channel at a second frame rate while presenting the first frames, wherein the second frame rate is lower than the first frame rate.

53. A processor for processing multimedia data, the processor being adapted to:

receive multiple channels of the multimedia data;

decode frames associated with two or more of the channels, by decoding substantially all received frames associated with the first channel, and decoding channel switch frames (CSFs) associated with the second channel, wherein each individual channel switch frame (CSF) is a non-predictive frame;

cause a display to present first frames of a first channel at a first frame rate; and cause a display to present second frames of a second channel at a second frame rate while presenting the first frames, wherein the second frame rate is lower than the first frame rate.

54. The method of claim 1, wherein each CSF is received via a multicast.

55. The apparatus of claim 18, wherein each CSF is received via a multicast.

56. The apparatus of claim 35, wherein each CSF is received via a multicast.

57. The computer program product of claim 52, wherein each CSF is received via a multicast.

58. The processor of claim 53, wherein each CSF is received via a multicast.

59. The computer program product of claim 52, wherein to present the first and second frames comprises to present the first and second frames within a common display of a wireless apparatus.

60. The computer program product of claim 59, further comprising to decode the frames with a single decoder within the wireless apparatus.

61. The computer program product of claim 59, further comprising to define relative positions of the first frames relative to the second frames within the common display based on user input.

62. The computer program product of claim 61, further comprising:

to swap the relative positions of the first frames relative to the second frames;

to present the first frames at the second frame rate; and to present the second frames at the first frame rate.

63. The computer program product of claim 52, wherein to present the second frames comprises to present the second frames within the first frames in a picture-in-picture format.

64. The computer program product of claim 52, further comprising to present a plurality of frames around a periphery of the first frames, wherein the second frames are included within the plurality of frames around the periphery.

65. The computer program product of claim 52, wherein the first frame rate is approximately 30 frames per second and the second frame rate is approximately 1 frame per second.

66. The computer program product of claim 52, further comprising to present third frames of a third channel at the second frame rate while presenting the first frames.

67. The computer program product of claim 52, wherein decoding the frames comprises:

to decode substantially all received frames associated with the first channel; and to decode a subset of received frames associated with the second channel.

68. The computer program product of claim 52, wherein to decode the CSFs comprises to access pointers from a media logical channel (MLC) to the CSFs within the second channel and to acquire the CSFs from the second channel based on the pointers.

69. The computer program product of claim 52, wherein to decode the CSFs comprises to acquire the CSFs associated with the second channel from a media logical channel (MLC).

70. The computer program product of claim 69, further comprising to access pointers from the MLC to the CSFs, the CSFs being within the MLC.

71. The computer program product of claim 52, wherein to decode the CSFs comprises to acquire the CSFs from the second channel.

72. The computer program product of claim 52, wherein the first and second channels comprise two different views associated with a common broadcast.

73. The computer program product of claim 52, further comprising to present the second frames at a lower resolution than the first frames.

74. The computer program product of claim 52, wherein the first frames are encoded at the first frame rate and the second frame are encoded at the second frame rate.

75. The processor of claim 53, wherein to present the first and second frames comprises to present the first and second frames within a common display of a wireless apparatus.

76. The processor of claim 75, further comprising to decode the frames with a single decoder within the wireless apparatus.

77. The processor of claim 75, further comprising to define relative positions of the first frames relative to the second frames within the common display based on user input.

78. The processor of claim 77, further comprising:

to swap the relative positions of the first frames relative to the second frames;

to present the first frames at the second frame rate; and to present the second frames at the first frame rate.

79. The processor of claim 53, wherein to present the second frames comprises to present the second frames within the first frames in a picture-in-picture format.

80. The processor of claim 53, further comprising to present a plurality of frames around a periphery of the first frames, wherein the second frames are included within the plurality of frames around the periphery.

81. The processor of claim 53, wherein the first frame rate is approximately 30 frames per second and the second frame rate is approximately 1 frame per second.

82. The processor of claim 53, further comprising to present third frames of a third channel at the second frame rate while presenting the first frames.

83. The processor of claim 53, wherein decoding the frames comprises:

to decode substantially all received frames associated with the first channel; and to decode a subset of received frames associated with the second channel.

84. The processor of claim 53, wherein to decode the CSFs comprises to access pointers from a media logical channel (MLC) to the CSFs within the second channel and to acquire the CSFs from the second channel based on the pointers.

85. The processor of claim 53, wherein to decode the CSFs comprises to acquire the CSFs associated with the second channel from a media logical channel (MLC).

86. The processor of claim 85, further comprising to access pointers from the MLC to the CSFs, the CSFs being within the MLC.

87. The processor of claim 53, wherein to decode the CSFs comprises to acquire the CSFs from the second channel.

88. The processor of claim 53, wherein the first and second channels comprise two different views associated with a common broadcast.

89. The processor of claim 53, further comprising to present the second frames at a lower resolution than the first frames.

90. The processor of claim 53, wherein the first frames are encoded at the first frame rate and the second frame are encoded at the second frame rate.

* * * * *